United States Patent [19]

Cassidy

[11] Patent Number: 5,061,039

[45] Date of Patent: Oct. 29, 1991

[54] DUAL AXIS TRANSLATION APPARATUS AND SYSTEM FOR TRANSLATING AN OPTICAL BEAM AND RELATED METHOD

[75] Inventor: Kelly Cassidy, Manteca, Calif.

[73] Assignee: The United States of America as represented by the United States Department of Energy, Washington, D.C.

[21] Appl. No.: 542,226

[22] Filed: Jun. 22, 1990

[51] Int. Cl.$^5$ .......................... G02B 7/00; G02B 6/42; G02B 27/00; G05G 11/00

[52] U.S. Cl. ........................... 359/894; 269/73; 74/479; 356/440; 359/896

[58] Field of Search ............... 350/321, 319, 531, 247, 350/573, 96.20; 414/749; 269/73; 74/479; 356/440

[56] References Cited

U.S. PATENT DOCUMENTS

| 480,245 | 8/1892 | Boyer | 350/531 |
|---|---|---|---|
| 2,380,209 | 7/1945 | Bachman et al. | 350/321 |
| 3,525,140 | 8/1970 | Cachon et al. | 350/531 |
| 3,989,358 | 11/1976 | Melmoth | 350/247 |
| 4,126,376 | 11/1978 | Gommel et al. | 350/531 |
| 4,409,860 | 10/1983 | Moriyama et al. | 74/479 |
| 4,652,095 | 3/1987 | Mauro | 350/531 |
| 4,766,465 | 8/1988 | Takahashi et al. | 350/531 |
| 4,767,188 | 8/1988 | Myer | 350/247 |
| 4,772,109 | 9/1988 | Cutburth et al. | 350/531 |
| 4,859,029 | 8/1989 | Durell | 350/321 |
| 4,884,015 | 11/1989 | Sugimoto et al. | 350/96.20 |
| 4,948,330 | 8/1990 | Nomura et al. | 350/531 |

FOREIGN PATENT DOCUMENTS

| 110814 | 10/1928 | Austria | 350/531 |
|---|---|---|---|
| 307187 | 3/1932 | Fed. Rep. of Germany | 350/247 |
| 2124200 | 11/1972 | Fed. Rep. of Germany | 350/531 |

Primary Examiner—Jon W. Henry
Attorney, Agent, or Firm—Miguel A. Valdes; Roger S. Gaither; William R. Moser

[57] ABSTRACT

A dual axis translation device and system in accordance with this invention, for translating an optical beam along both an x-axis and a y-axis which are perpendicular to one another, has a beam directing means acting on said optical beam for directing the beam along a particular path transverse to said x and y axes. An arrangement supporting said beam directing means for movement in the x and y direction within a given plane is provided. The arrangement includes a first means for translating said beam directing means along the x-axis in said given plane in order to translate the beam along said x-axis. The arrangement comprises a second means for translating said beam directing means along the y-axis in said given plane in order to translate the beam along said y-axis.

16 Claims, 3 Drawing Sheets

DUAL AXIS TRANSLATION APPARATUS AND SYSTEM FOR TRANSLATING AN OPTICAL BEAM AND RELATED METHOD

BACKGROUND OF THE INVENTION

The Government has rights in this invention pursuant to Contract No. W-7405-ENG-48 awarded by the U.S. Department of Energy.

FIELD OF THE INVENTION

The present invention relates generally a translation apparatus for aligning optical devices. More specifically, the present invention relates to a single stage dual axis translator which can translate optical components or optical signals along two axes in a single geometric plane.

SUMMARY OF THE PRIOR ART

As research has progressed in the field of lasers their use has rapidly expanded into new areas. It is often the case that research and development is finding new uses for lasers faster than machinist can make necessary mounting and aligning apparatus.

For instance in the field of radio-active isotope gases, lasers are used to identify the type of isotope in a gas. Once identified, a laser beam of specific frequency and intensity may be sent into the gas to excite and separate the identified isotope from the gas. Problems arise in this endeavor when an attempt is made to align heavy test equipment and optics. When aligning optics precise movement of the optical beam must be possible, regardless of the weight of the test equipment being aligned. Thus, a demand has arisen for a device which can align heavy optics or test equipment along both a first and second perpendicular axis, for example x and y axes. The device should also be of minimum size to promote efficient use of space.

The prior art has produced an x-y translator which translates a plate along an x and a y axis which are perpendicular to one another. The translator plate is used for mounting optical devices and translating them in a horizontal plane. For instance, an optical device could be mounted on the plate and then moved from side to side for alignment and in and out for focusing. This device can only be used in the horizontal plane. It may be configured with an aperture which passes light. An additional prior art x-y translator provides horizontal and vertical translation. However, it is only a mounting translator, and does not pass light.

These two prior art devices do not have support rods which run across the entire length of the x-y translator. For this reason and because of the general design of the prior art devices, they cannot support translation of heavy test equipment. Also, the prior art devices rely on ball-bearings for low friction movement. The problem is that if the device is tipped at an angle where a plate does not rest squarely on the ball bearings, the plate may catch and stall.

The prior art also contains apparatus which are only capable of translating optical devices along a single axis at a time. For example, Oriel, a major manufacturer of optical positioners from Stratford, Connecticut, makes such a positioner. Oriel produces various configurations of translators (devices which can move optics along an axis). Some have a large opening for the passage of light, but are limited in their range of movement. Others combine movement along a single axis with rotation capabilities. Still, others provide a larger range of movement along an axis but have a small aperture.

Melles Griot, another leading producer, produces optical translator similar to Oriel. There devices are limited, however, to only being able to move in one direction in a given plane.

In an effort to achieve two axis translation in a single plane, the prior art has placed two identical single axis translators on top of one another with one being rotated 90° relative to the other in order to provide optical translation in two perpendicular axes. Since one is on top of the other, however, the perpendicular axes are in different planes.

First, this configuration is unnecessarily bulky. Second and more important, if two translators with fixed apertures are placed on one another, and moved along different axes their common aperture shrinks in size because of overlapping. This curtails the amount of the light which can pass therethrough. The further the movement is off the center point the greater the amount of light that is lost. The more light lost, the less light available for manipulation and alignment. Also, this configuration does not provide the necessary strength to mount heavier optical or analytical equipment.

SUMMARY OF THE INVENTION

It is, therefore, on object of the invention to provide an x-y translator which can translate along both a first and second axis in a given plane and is capable of passing a light beam unobstructed.

It is another object of the invention to provide the same translator as above that is capable of aligning heavy optical and analytical equipment in both a horizontal or vertical plane.

The attainment of these and related objects may be achieved through use of the novel dual axis translation device and system herein disclosed. The dual axis translation device and system in accordance with this invention serves to translate an optical beam along both an x-axis and a y-axis which are perpendicular to one another. This devices includes a beam directing means acting on said optical beam for directing the beam along a particular path transverse to these axes. Furthermore, an arrangement supporting the beam directing means for movement in the x and y direction within a given, single plane is provided. The arrangement includes a first means for translating the beam directing means along the x-axis in the given plane in order to translate the beam along the x-axis. Additionally, the arrangement comprises a second means for translating the beam directing means along the y-axis in the given plane in order to translate the beam along the y-axis.

The attainment of the foregoing and related objects, advantages and features of the invention should be more readily apparent to those skilled in the art, after review of the following more detailed description of the invention, taken together with the drawings.

DETAILED DESCRIPTION OF THE DRAWINGS

3

Figure 2:
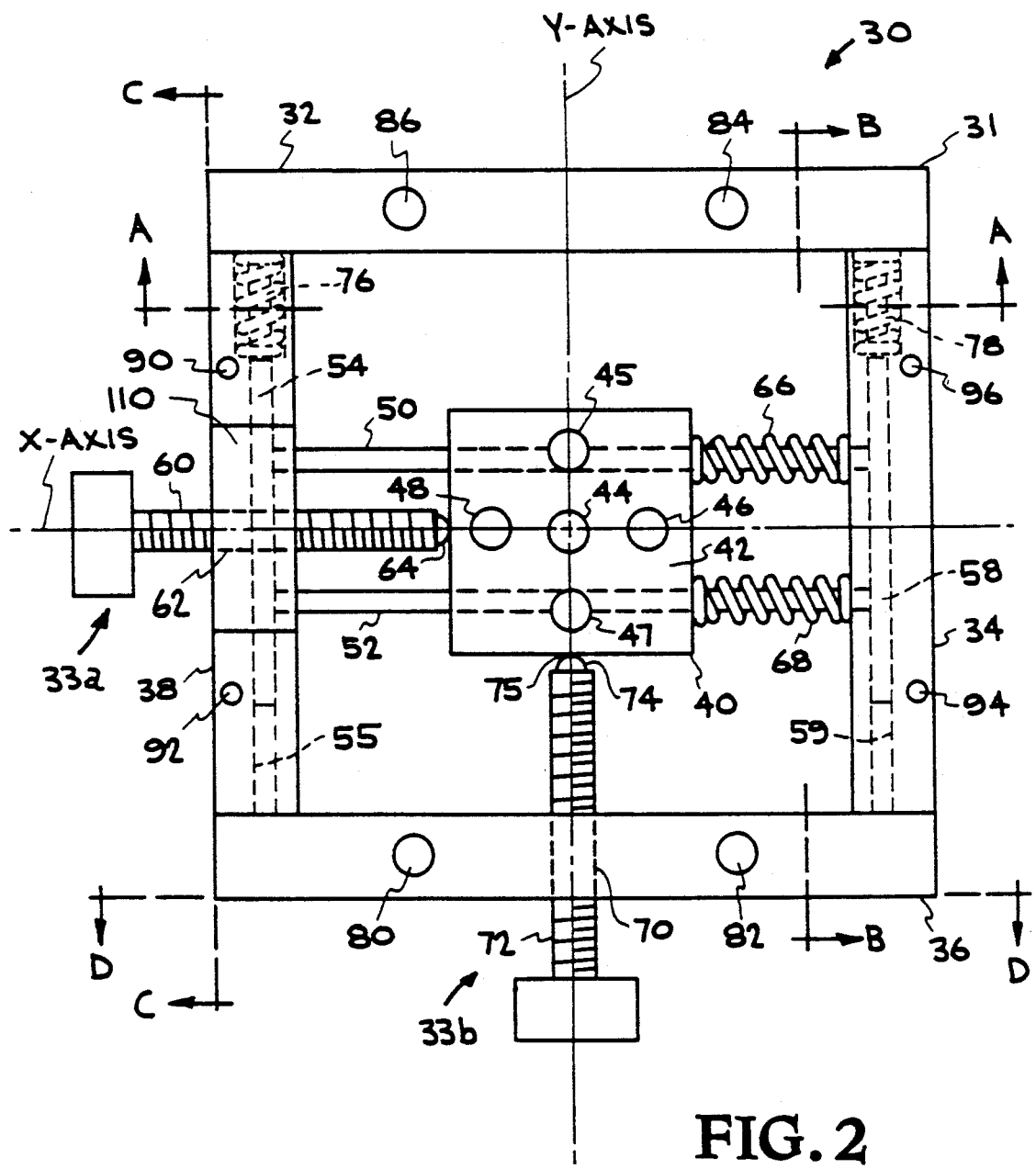
FIG. 2 is a view of the system shown in FIG. 1, taken generally along line 2—2 in FIG. 1.
Figure 3:
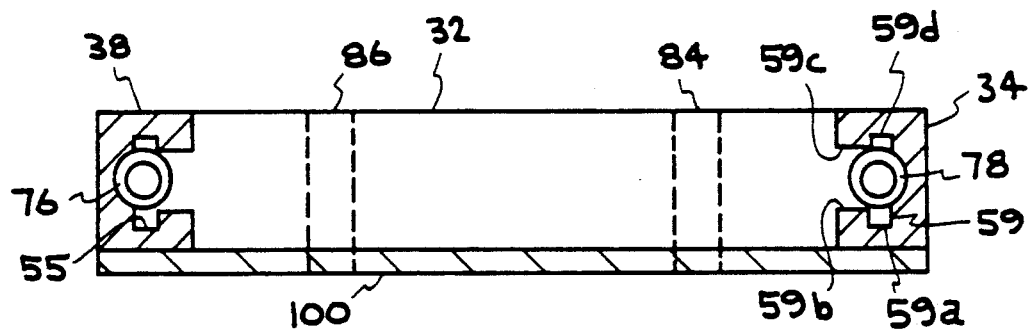

FIG. 3 is a side transparent cross-sectional view of the preferred embodiment along a first axis taken along line A—A of FIG. 2.

Figure 4:
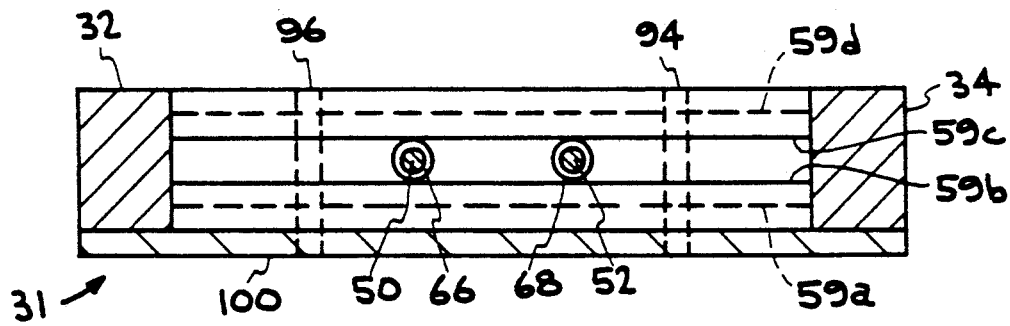

FIG. 4 is a side transparent cross-sectional view of the preferred embodiment along a second axis, perpendicular to the first axis taken along section line B—B of FIG. 2.

Figure 5:
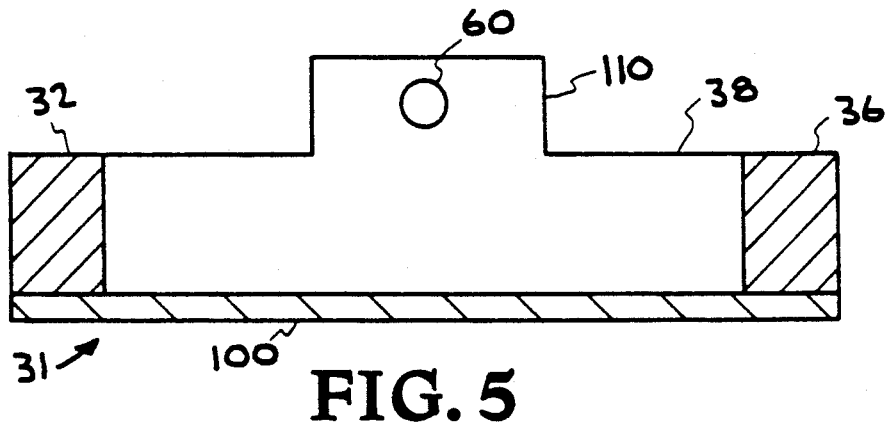

FIG. 5 is a side view of the preferred embodiment along a first axis taken along section line C—C of FIG. 2.

Figure 6:
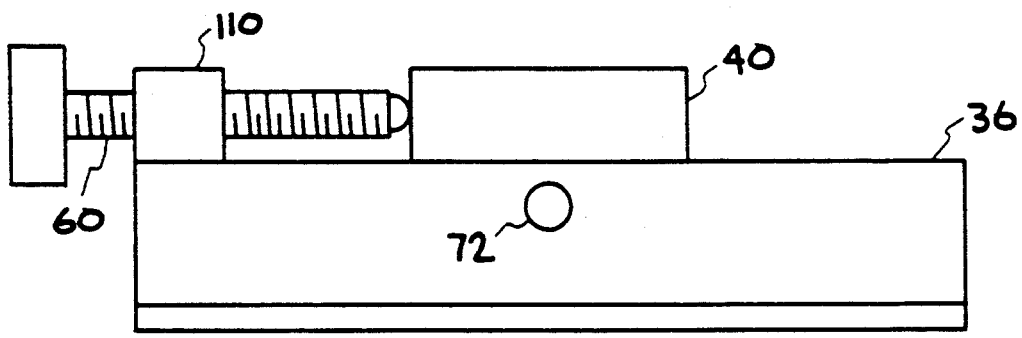

FIG. 6 is a side view of the preferred embodiment along a second, perpendicular to the first axis taken along section line D—D of FIG. 2.

DETAILED DESCRIPTION OF THE PREFERRED EMBODIMENT

Figure 1:
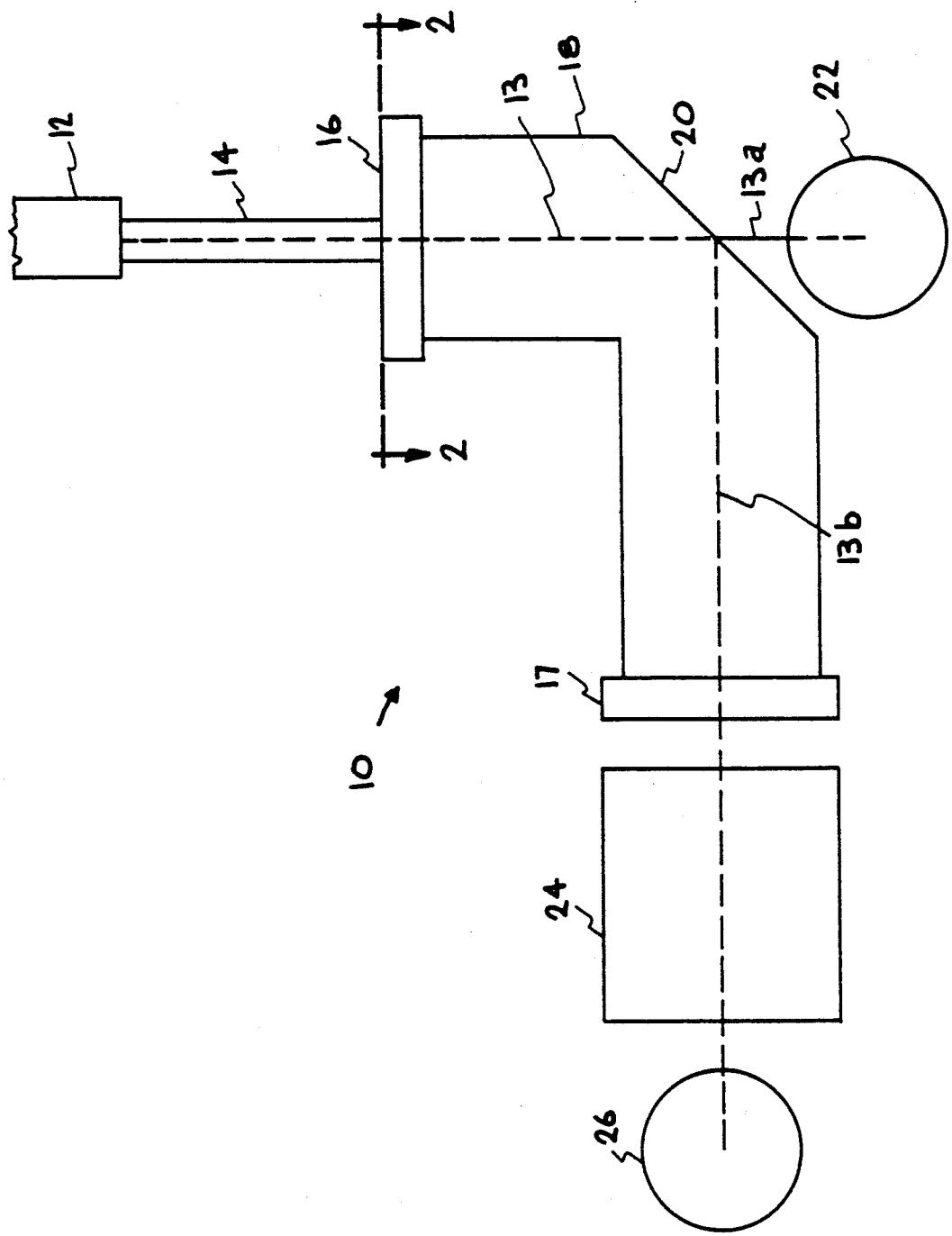
FIG. 1 is a plan view schematically illustrating the overall system in which the preferred embodiment is applied.

The preferred embodiment of the present invention is used in an optical system 10 for the detection of isotopes in a gas. The preferred embodiment 16 is a mechanical device used to align optical components so that an optical beam may pass unobstructed to a desired location. Referring to FIG. 1, a light source 12 outputs a light beam 13 to an optical fiber 14. The light beam is positioned by a dual axis translator 16 to impinge upon a desired portion of a beam splitter 20. Hitting the desired portion of the beam splitter 20 will cause the light beam to propagate through a test chamber 24 and on to a sensor 26.

The principle behind this application of the present invention is to split a beam of light and send one portion 13A to a reference sensor 22. The other portion 13B propagates through a test chamber 24 and is detected by the sensor 26. The properties of the light received by the sensor 26 are then compared against those of the reference sensor 22. From the differences it is possible to determine which isotopes are present in the gas in the test chamber 24. Once that information is known the system can separate the desired isotopes by inputting a more intense laser at a specific frequency.

The beam splitter 20 which passes about 30% of the incident light and deflects about 70% through the test chamber 24 is housed inside an optical chamber 18. To ensure proper alignment of the optical fiber to the beam splitter 20 the dual axis translation device 16 is used. Similarly, a second dual axis translation device 17 is used to align the deflected light out of the optical chamber such that it propagates through the test chamber 24 to the sensor 26. The second translator 17 is identical in principle and operation to the first 16. Therefore, only the first translator 16 is described. The preferred embodiment of this dual axis translation device will now be described in detail with reference to the drawings.

Referring to FIG. 2, the translator which is generally indicated by the reference numeral 30 in that figure, is comprised of a plurality of plates 32, 34, 36 and 38, and a bottom plate 100 (see FIGS. 3-6), which define a frame 31. Within these plates 32-38 is a beam directing member 40. On the top face 42 of the directing member 40, the fiber optic cable 14 (FIG. 1) may be attached. The bottom or interior side of the directing member 40 (not shown because it faces into the page) is disposed within and faces into the optical chamber 18 (of FIG. 1). A throughhole 44 is centrally located in the directing member 40 for passing light from fiber optic cable 14.

Through this hole 44 light passes unobstructed to whatever device is connected at the other side of the directing member 40. The hole 44 is occupied by free

4 space (air). The hole 44 may, alternatively, be configured so as to contain a rotatable lens. Surrounding the hole 44 are mounting bores 45-48. These bores may be used to mount optical devices to the bottom or interior side of directing member 40 within chamber 18 or to the top or outer side 42. Examples of optical devices are fiber optic cables, lenses, etc.

Cooperating with the frame 31 is a first arrangement 33A for positioning the directing member 40 at desired locations along an x-axis. Also included is a second arrangement 33B for positioning the directing member 40 along the y-axis. These arrangements move the directing member 40 in the same given plane. Thus, when it is sought to direct light to a specific point on the beam splitter 20 the directing member 40 can be translated in the x and y axes until it reaches a desired location.

Focusing more closely on the x-axis positioning arrangement 33A, a pair of parallel rods 50 and 52 are provided. These rods are parallel to the x-axis and extend through the directing member 40. A very low friction contact is created between the directing member 40 and the parallel rods 50 and 52 so that the directing member may be translated freely along the x-axis. This is accomplished by using ground stock material for the rods 50 and 52 which will track without catching. Also, the interior of the holes drilled through the directing member 40 may be wireburned to make their surface smooth. Wireburn consists of heating a metal wire (with a melting point much greater than the metal of the directing member, which is usually aluminum) and searing the interior of the bore.

These holes drilled in the directing member 40, through which the rods 50 and 52 run, are parallel to the x-axis. Thus, the member 40 may translate freely along the x-axis without the use of teflon shims or ball-bearings.

Each of the rods 50-52 is of equal length. The ends of the rods are collected on one end in a first boot 54. The first boot 54 is housed in plate 38. The ends of the rods are collected on the other end in a second boot 58. The second boot 58 is housed in the plate 34. The boots 54 and 58 are shown by dotted lines in this figure because they are internal to the plates 34 and 38. The first boot 54 rests in a track 55 internal to the plate 38. The second boot 58 rests in a track 59 internal to the plate 34. The internal path of track 55 is shown by the dotted line 57. The internal path of track 59 is shown by the dotted line 61.

To move the directing member 40 a positioning screw 60 is used. A threaded bore 62 is created in the plate 38 through which the screw 60 is threaded. Partially enclosed on the end of the screw 60 is a ball-bearing 64. The ball-bearing 64 is used to minimize friction between the screw 60 and the directing member 40 as the screw 60 is turned and also as the directing member 40 translates along the y-axis. As the screw 60 is turned it advances inward toward the directing member 40 pushing it along the x-axis. The movement of the directing member 40 is guided by the rods 50 and 52. A micrometer could alternatively be used in place of a screw 60.

On the other side of the directing member are a pair of springs 66 and 68. The spring 66 surrounds the rod 50 and is located between the directing member 40 and the plate 34. The spring 68 surrounds the rod 52 and is located between the directing member 40 and the plate 34. The springs 66 and 68 exert a pressure on the directing member 40 in the direction of the position screw 60 so that the member 40 and the screw 60 are always in contact, regardless of the position on the assembly 30 (i.e.. the effects of gravity). Thus, when screw 60 is advanced outward, away from member 40, the latter follows it due to the biasing forces applied to it by springs 66 and 68.

Focusing now on translation along the y-axis, the arrangement 33B for moving the beam directing member 40 in the y-axis operates under the same principle used by the x-axis arrangement 33A. The member 40 and the arrangement 33A including the rods 50 and 52, the boots 54 and 58 and the springs 66 and 68, with the exception of the screw 60, are supported for movement back and forth in tracks 55 and 59 along the y-axis. A pair of springs 76 and 78 bias this configuration (the member 40, rods 50 and 52, boots 54 and 58, and springs 66 and 68) in the direction of a y-axis positioning screw 72 and serve as a resisting apparatus.

More specifically, the plate 36 has a threaded bore 70. The bore 70 is centrally located and parallel to the y-axis. Threaded through the bore 70 is a positioning screw 72. This screw 72 operates in much the same way as screw 60 with respect to the x-axis. As the screw 72 is screwed in it asserts pressure on the directing member 40 pushing it, the parallel rods 50–52 and the attached boots 54 and 58 along the y-axis.

Conversely, as screw 72 is unscrewed, the directing member 40 moves in the opposite direction along the y-axis (pushed along by the springs 76 and 78). The boots 54 and 58 and the tracks 38 and 34 are configured in such a manner as to minimize friction so that the boots 54 and 58 (and the directing member 40 and parallel rods 50 and 52) can move along the tracks 38 and 34 freely. To produce low friction movement the tracks 38 an 34 are wireburned. This leaves a very smooth track surface. Smoother than can be obtained from sanding and buffing. Additionally, the boots 54 and 58 are made of ground stock material. Thus, the boots 54 and 58 can move within the tracks without catching.

FIG. 2 is a top view of the translator 16. Therefore, it shows the screw 60 to be at the same level as the boot 54 and the track 55, intersecting them. In the preferred embodiment the screw 60 is actually above (out of the page from) the track 55 and boot 54. This aspect of the preferred embodiment is further discussed in connection with FIGS. 5 and 6 below.

Located on the end of the screw 72 is a ball-bearing 74. The ball-bearing 74 reduces friction at the screw-directing member interface 75 which may be caused from the turning of the screw 72 and from translation of the directing number 40 along the x-axis. Any alternate friction reducing apparatus could be used.

Focusing now on the springs 76 and 78 serving as a resisting apparatus, pressure is exerted through the tracks 38 and 34 on to the boots 54 and 58, respectively, by means of the springs. Located in track 55 between the boot 54 and the plate 32 is the spring 76. This spring 76 maintains a constant pressure on the boot 54. The spring 78 is similarly located in track 59 between the boot 58 and the plate 32. Spring 78 exerts a constant pressure on boot 58. These two springs 76 and 78 combine to push the directing member 40 toward the y-axis positioning screw 72. Since contact is maintained between the directing member 40 and the positioning screw 72, any movement of the screw 72 is reflected in the directing member 40. Thus, when the screw 72 is moved in or out along the y-axis the directing member 40 is moved by the same amount.

All of the components which make up the translator are made of aluminum. However, any suitable metal could be used. For example, titanium could also be used. The aluminum components are black anodized to harden their surface. That way they do not out gas as much as regular aluminum when in a vacuum chamber. The black anodization makes the surface strong while maintaining the light overall weight of the translator 16 provided by the aluminum.

The strength of the translator 16 of the present invention is significantly greater than that of the prior art. The translator cf the preferred embodiment can move a 15 lb. optical chamber 18. To use a translator of the prior art to accomplish such a task would result in destruction of the prior art translator because its components would bend out of alignment. The added strength of the translator 16 is because of its rods 50 and 52 which traverse across the entire length of the translator 16, and the boots 54 and 58 which securely maintain the rods 50 and 52, and allow very low friction translation throughout any horizontal or vertical position.

Additional components of the translator 16 or 30 described above are mounting bores 80–86 for mounting the translator 30 to various devices. These bores 80–86 permit the translator 30 to be mounted to optical devices (also referred to as optics). Also, bores 80–86 are used to mount the plates 38 and 34 (which contain the tracks 54 and 58, respectively) to the frame 31. These features are perhaps better shown in FIGS. 3–6 which follow.

Referring to FIG. 3, a cross-sectional view of the plates 38 and 34 is shown. The cross-section is cut away at line A—A (of FIG. 2). From this view the dimensions of the track 55 are readily apparent as is the location of the spring 76. To the right, plate 34 is shown. Inside the plate 34 is the track 59. Inside the track is the spring 78. The plates are attached to the base plate 100 which is part of the frame 31. Illustrated by dotted lines are the bores 86 and 84 of plate 32.

Referring to FIG. 4, a cross-sectional view is taken at line B—B (of FIG. 2) of the track 59 and the plate 34. The plate 34 is housed on the frame 31 attaching to the base plate 100 at bores 96 and 94. It is located between plates 32 and 36. The opening of the track 59 is defined by a bottom lip 59b and a top lip 59c. A visible portion of the boot 58 can be seen though the opening defined by the lips 59b and 59c. Cross-sectional portions of the rods 50 and 52 are shown. They are surrounded by springs 66 and 68, respectively. Dotted line 59a represents the bottom of the track 59, not visible from this perspective. Dotted line 59d represents the top of the track 59, likewise not visible from the perspective shown.

Referring to FIG. 5, a view of the translator 30 from line C—C (of FIG. 2) is shown. An x-axis positioning member block 110 is formed on the plate 38. This configuration holds the x-axis positioning screw 60 above the track 54 which is internal to the plate 38, prohibiting, thereby, interference between the x-axis positioning screw 60 and the movement of the boot 54 within the track 55. Plate 38 is joined to the frame 31 which is comprised of the plate 32 and 36 and the bottom plate 100.

Referring to FIG. 6, a plain view is shown from line D—D (of FIG. 2). The x-axis positioning screw 60 is threaded through the bore 62 in the block 110. The screw 60 extends to the directing member 40 at a point above the maximum height of the plate 36 (and all other plates 32-38). It is also above the y-axis positioning screw 72. This configuration eliminates interference between the x and y axis positioning arrangements 33A and 33B as they translate the directing member 40, in the same plane, along their respective axes.

It should further be apparent to those skilled in the art that various changes in form and details of the invention as shown and described may be made. It is intended that such changes be included within the spirit and scope of the claims appended hereto.

What is claimed is:

1. A dual axis translation device for translating an optical beam along both an x-axis and a y-axis which are perpendicular to one another, and capable of functioning in a vertical plane and a horizontal plane, and in any position therebetween, comprising:
   (a) beam directing means having a fixed aperture for accommodating the passage of said optical beam through the beam directing means and acting on said optical beam for directing it through said aperture along a particular path transverse to said x and y axes;
   (b) an arrangement supporting said beam directing means including said fixed aperture and the beam passing through said aperture for movement as a single unit in the x and y direction within a given plane, said arrangement including
      (1) first means for translating said beam directing means along the x-axis in said given plane in order to translate the beam along said x-axis including
         (A) means for positioning the beam directing means at desired position along the x-axis;
         (B) means for maintaining physical contact between the x-axis positioning means and the beam directing means;
      (2) second means for translating said beam directing means along the y-axis in said given plane in order to translate the beam along said y-axis;
      (3) wherein the first translating means further comprises;
         (A) a frame comprised of a plurality of plates; and
         (B) means for guiding and supporting the beam directing means along the x-axis, said guiding and supporting means extending the entire length of the frame to provide uniform support to said beam directing means regardless of the extent to which it has been translated along said x and y axis within the frame;
   (c) wherein said first translation means further comprises:
      (1) a first plate and a second plate located on opposite sides of the beam directing means, perpendicular to the x-axis;
      (2) a plurality of parallel members of equal length contained within the frame which are parallel to the x-axis and bisect the beam directing means for supporting and aligning the beam directing means as it is translated along the x-axis;
      (3) a first boot connected to one end of the plurality of parallel members, and housed in the first plate;
      (4) a second boot connected to the other end of the plurality of parallel members, and housed in the second plate, the first and second boot operating together for securing said parallel members and maintaining their parallel structure; and
      (5) means for supporting the x-axis positioning means on the first plate so that the x-axis positioning means exerts a force parallel to the x-axis which moves the beam directing means along the x-axis.

2. The dual axis translation device of claim 1 wherein the x-axis positioning means further comprises a threaded bore in the first plate, perpendicular to the plate, and a screw parallel to the x-axis threaded therethrough, so that as the screw is moved along the x-axis it translates the beam directing means along the x-axis; and a means for reducing friction at a screw-beam directing means contact point.

3. The dual axis translation device of claim 1 wherein the maintaining means further comprises:
   a plurality of resilient means one each surrounding each of the plurality of parallel members and located between the beam directing means and the second boot for maintaining pressure against the beam directing means such that the side of the beam directing means opposite the plurality of resilient means is always in contact with the x-axis positioning means.

4. The dual axis translation device of claim 3 wherein the second translating means further comprises:
   a first plate having a first track and a second plate having a second track, the first and second plate being parallel to the y-axis;
   a third and fourth plate, connected between the first and second plates, located on opposite sides of the beam directing means from one another and perpendicular to the y-axis;
   a plurality of parallel members of equal length which bisect the beam directing means and are parallel to the x-axis for supporting the beam directing means so that it is free to translate along the x-axis;
   a first boot means for retaining one end of the parallel members in the first track of the first plate;
   a second boot means for retaining the other end of the parallel members in the second track of the second plate; and
   means for beam supporting the y-axis positioning means on the third plate so that the y-axis positioning means exerts a force parallel to the y-axis which moves the beam directing means along the x-axis.

5. The dual axis translation device of claim 4 wherein the y-axis positioning means further comprises a threaded bore in the third plate, perpendicular to the plate, and a screw parallel to the y-axis threaded therethrough, so that as the screw is moved along the y-axis it translates the beam directing means along the y-axis; and a means for reducing friction at a screw-beam directing means contact point.

6. The dual axis translation device of claim 5 wherein the maintaining means further comprises:
   a first resilient means located in the first track between the first boot means and the fourth plate;
   a second resilient means, equal to the first resilient means, located in the second track between the second boot means and the fourth plate, the first and second means operating together to maintain pressure on said boot means which are connected to the parallel members which guide and support the beam directing means so that the y-axis positioning means is always in physical contact with the mounting means.

7. The dual axis translation device of claim 1 wherein the beam directing means further comprises and optical fiber connected at its end to the beam directing means, said connecting being around the fixed aperture of said beam directing means.

8. A dual axis translation device for translation an optical beam along both an x-axis and a y-axis which are perpendicular to one another, and capable of functioning in a vertical plane and a horizontal plane, and in any position therebetween, comprising:
  (a) beam directing means having a fixed aperture for accommodating the passage of said optical beam through the beam directing means and acting on said optical beam for directing it through said aperture along a particular path transverse to said x and y axes;
  (b) an arrangement supporting said beam directing means including said fixed aperture and the beam passing through said aperture for movement as a single unit in the x and y direction within a given plane, said arrangement including
    (1) first means for translating said beam directing means along the x-axis in said given plane in order to translate the beam along said x-axis including
      (A) means for positioning the beam directing means at desired position along the x-axis;
      (B) means for maintaining physical contact between the x-axis positioning means and the beam directing means;
    (2) second means for translating said beam directing means along the y-axis in said given plane in order to translate the beam along said y-axis including
      (A) means for positioning the beam directing means at a desired position along the y-axis;
      (B) means for maintaining physical contact between the y-axis positioning means and the beam directing means;
    (3) wherein the second translating means comprises:
      (A) a frame comprised of a plurality of plates; and
      (B) means for guiding and supporting the beam directing means along the y-axis, said means extending the entire length of the frame to provide uniform support to said beam directing means regardless of the extent to which it has been translated along said x and y axis with the frame.

9. A system for identifying isotopes in a gas wherein a light source emits a beam through a fiber optic cable, said beams being directed by a dual axis translator on to a beam splitter, the beam splitter directing a portion of the beam to a reference sensor and another portion of the beam being directed by a dual axis translator through a gas test chamber and on to another sensor, the measured difference between said other sensor and said reference sensor determining the isotope in the gas test chamber, each of said dual translators having:
  (a) beam directing means having a fixed aperture for accommodating the passage of said optical beam through the beam directing means and acting on said optical beam for directing it through said aperture along a particular path transverse to said x and y axes;
  (b) an arrangement supporting said beam directing means including said fixed aperture and the beam passing through said aperture for movement as a single unit in the x and y direction within a given plane, said arrangement including
    (1) first means for translating said beam directing means along the x-axis in said given plane in order to translate the beam along said x-axis, and
    (2) second means for translating said beam directing means along the y-axis in said given plane in order to translate the beam along said y-axis.

10. The system of claim 9 wherein the first translating means comprises:
  means for positioning the beam directing means at a desired position along the x-axis; and
  means for maintaining physical contact between the x-axis positioning means and the beam directing means.

11. The system of claim 10 wherein the second translating means comprises:
  means for positioning the beam directing means at a desired position along the y-axis; and
  means for maintaining physical contact between the y-axis positioning means and the beam directing means.

12. The system of claim 11 wherein the first translating means further comprises:
  a frame comprised of a plurality of plates; and
  means for guiding and supporting the beam directing means along the x-axis, said guiding and supporting means extending the entire length of the frame to provided uniform support to said beam directing means regardless of the extent to which it has been translated along said x and y axis within the frame.

13. The system of claim 12 wherein the first translating means further comprises:
  a frame comprised of a plurality of plates; and
  means for guiding and supporting the beam directing means along the y-axis, said guiding and supporting means extending the entire length of the frame to provided uniform support to said beam directing means regardless of the extent to which it has been translated along said x and y axis within the frame.

14. The system of claim 13 wherein the beam directing means further comprises an optical fiber connected at its end to the beam directing means, said connecting being around the fixed aperture of said beam directing means.

15. A method for identifying isotopes in a gas wherein a light source emits a beam through a fiber optic cable, said beam being directed by a dual axis translator on to a beam splitter, the beam splitter directing a portion of the beam to a reference sensor and another portion of the beam being directed by a dual axis translator through a gas test chamber and on to another sensor, the measured difference between said other sensor and said reference sensor determining the isotope in the gas test chamber, comprising the steps of:
  (a) providing a beam directing means, having a fixed aperture for accommodating the passage of said optical beam;
  (b) coupling said optical beam to said beam directing means so that said beam passes through said aperture uncurtailed, even during movement of said beam directing means along said x and y axes;
  (c) supporting said beam directing means including said aperture and the beam itself for movement in the x and y direction within a given plane, said supporting step including the steps:

(1) translating said beam directing means along the x-axis in said given plane in order to translate the beam along said x-axis; and
(2) translating said beam directing means along the y-axis in said given plane in order to translate the beam along said y-axis.

16. A method of claim 15 wherein the step of providing a beam directing means comprises the step of providing an optical fiber connected at its end to the beam directing means, said connection being around the fixed aperture of said beam directing means.

* * * * *